Nov. 27, 1945.   C. A. BICKEL   2,389,757
APPARATUS FOR OPERATING LEATHES
Filed March 21, 1941   4 Sheets-Sheet 1

INVENTOR
CLIFFORD A. BICKEL
By
ATTORNEYS

Nov. 27, 1945.  C. A. BICKEL  2,389,757
APPARATUS FOR OPERATING LATHES
Filed March 21, 1941  4 Sheets-Sheet 2

INVENTOR
CLIFFORD A. BICKEL

Nov. 27, 1945. C. A. BICKEL 2,389,757
APPARATUS FOR OPERATING LATHES
Filed March 21, 1941  4 Sheets-Sheet 4
FIG. 5
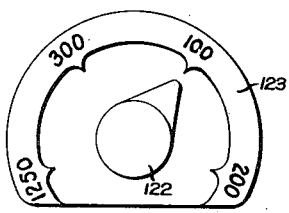
FIG. 6
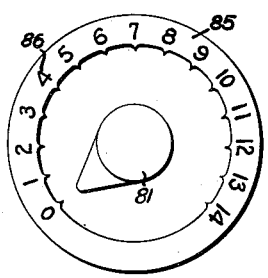
FIG. 7
| WORK DIA. | 100 F.P.M. | 200 F.P.M | 300 F.P.M. | 1250 F.P.M. |
|---|---|---|---|---|
| 2 | 191 R.P.M. | 382 R.P.M. | 573 R.P.M. | 2400 R.P.M. |
| 3 | 127 | 254 | 381 | 1582 |
| 4 | 96 | 191 | 287 | 1250 |
| 5 | 76 | 153 | 229 | 961 |
| 6 | 64 | 127 | 191 | 781 |
| 7 | 55 | 109 | 164 | 694 |
| 8 | 48 | 96 | 143 | 625 |
| 9 | 42 | 85 | 127 | 521 |
| 10 | 38 | 76 | 115 | 442 |
| 11 | 35 | 69 | 104 | 431 |
| 12 | 32 | 64 | 95 | 403 |
| 13 | 29 | 59 | 88 | 368 |
| 14 | 27 | 55 | 82 | 338 |
FIG. 8
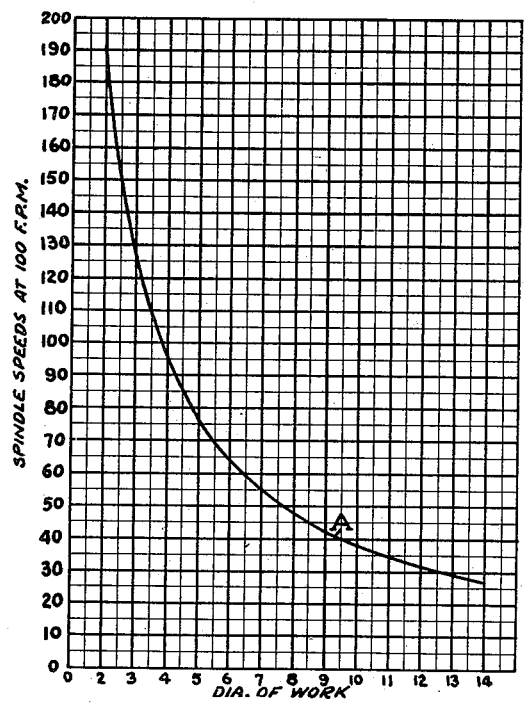
INVENTOR
CLIFFORD A. BICKEL
BY
ATTORNEYS Patented Nov. 27, 1945

2,389,757

UNITED STATES PATENT OFFICE 2,389,757

APPARATUS FOR OPERATING LATHES

Clifford A. Bickel, Sidney, Ohio, assignor to The Monarch Machine Tool Co., Sidney, Ohio, a corporation of Ohio Application March 21, 1941, Serial No. 384,507

11 Claims. (Cl. 82—28)

This invention relates to lathes, and particularly to a mechanism associated with a lathe, for controlling the speed of the spindle of the lathe to establish a constant cutting speed with respect to a cutting tool regardless of the diameter of the work being turned.

When making facing cuts upon a work piece, or of form turning by means of a single point cutting tool, the distance of the cutting tool to or from the center of rotation of the work varies considerably. If the rotation of the lathe spindle is held constant the surface cutting speed varies as the distance of the tool varies with respect the center of rotation of the work piece, the greater the distance between the center of rotation and the cutting tool the greater will be the surface cutting speed.

With the great variety of materials being turned upon lathes, there has been established various surface cutting speeds for the various materials which are most effective for turning each of the materials, and produces the most satisfactory finish upon the surface. The surface cutting speeds vary widely for various materials turned upon the lathe. It is desirable that the surface cutting speed shall remain constant at all times regardless of whether the cutting tool is making a longitudinal or transverse cut, or some combination thereof which will produce conical work or some type of form.

There have been previous attempts to produce a mechanism which will control the speed of the spindle of the lathe to vary the same inversely as the tool moves to and from the center of rotation, whereby the surface cutting speed is maintained substantially constant. None of the previous devices, however, have taken into consideration that it is desirable that more than one surface cutting speed should be obtainable upon the lathe in order to turn various types of material. The need for variation in the surface cutting speed is more acute at the present than existed under previous working conditions in view of the high speed working metals and the deep cutting obtained upon metals with the newer high speed cutting tools.

It is therefore an object of this invention to provide a mechanism for a turning machine which varies the speed of rotation of the spindle to establish a constant surface cutting speed, and to provide means for regulating the constant surface cutting speed.

It is another object of the invention to drive the spindle of a turning machine through means of a variable speed drive, and to control the drive in a manner to establish constant surface cutting speed, the control mechanism including a mechanism for altering the constant surface cutting speed.

Another object of the invention is to drive the spindle of a turning machine by means of an infinitely variable variable speed drive, the drive having a complete range of operation for turning maximum and minimum diameters capable of being swung by the lathe, and to provide a mechanism for changing the range of operation of the variable speed drive.

It is another object of the invention to provide a turning machine in accordance with the foregoing object wherein the range of operation of the variable speed drive, controlled by the control mechanism associated with the cross slide of the machine for establishing a constant surface cutting speed over the entire range of operation of the variable speed drive.

It is another object of the invention to provide an automatic control mechanism for regulating the speed of rotation of the spindle of a turning machine to establish a constant surface cutting speed, and to provide mechanism for altering the complete range of operation over which the control mechanism can function.

It is still another object of the invention to provide a turning machine wherein the spindle is driven by a variable speed drive mechanism, which mechanism is provided with means for manually setting the same to control the speed of operation of the spindle, and a mechanism associated with the cross slide of the lathe is provided for automatically regulating the speed of operation of the spindle in accordance with the position of the tool-holder of the cross slide to the axis of rotation of the spindle.

It is still a further object of the invention to provide manual and automatic control means for a variable speed transmission, which control means actuates the transmission through a common mechanism for varying the output speed of the transmission.

It is another object of the invention to provide a turning machine having the control mechanism of the foregoing object, and of associating therewith a change-speed mechanism for altering the complete range of operation of the spindle of the lathe to produce various surface cutting speeds.

It is another object of the invention to provide a turning machine in accordance with any of the foregoing objects wherein the variable speed transmission is infinitely variable over a complete range of operation wherein the transmission is of the hydraulic type.

It is another object of the invention to provide a drive mechanism for the spindle of a turning machine for varying the speed thereof and establishing a constant surface turning speed over the complete normal range of operation of the machine, and to provide mechanism associated therewith for raising or lowering the complete range of operation to increase or decrease the constant surface cutting speed.

It is still another object of the invention to provide a mechanism in accordance with the foregoing objects wherein the surface speed control mechanism is directly responsive to the surface speed of the work immediately adjacent the cutting tool.

It is another object of the invention to provide an infinitely variable variable speed drive for a turning machine which is controlled by a control mechanism associated with the cross slide of the machine, which mechanism senses the surface speed of a work piece immediately adjacent the cutting edge of the cutting tool, and alters the speed of the variable speed transmission in accordance therewith.

Further objects and advantages will become apparent from the drawings and the following description.

In the drawings:

Figure 5 is an elevational view of the gear ratio dial associated with the change-speed mechanism of Figure 4.

Figure 6 is an elevational view of the work diameter dial associated with the variable speed transmission.

Figure 7 is a chart representing the various revolutions per minute of the spindle of the lathe to obtain various feet per minute of surface cutting speed at various work diameters.

Figure 8 is a chart of spindle speeds plotted against work diameters to obtain constant surface cutting speed at 100 feet per minute.

Figure 1:
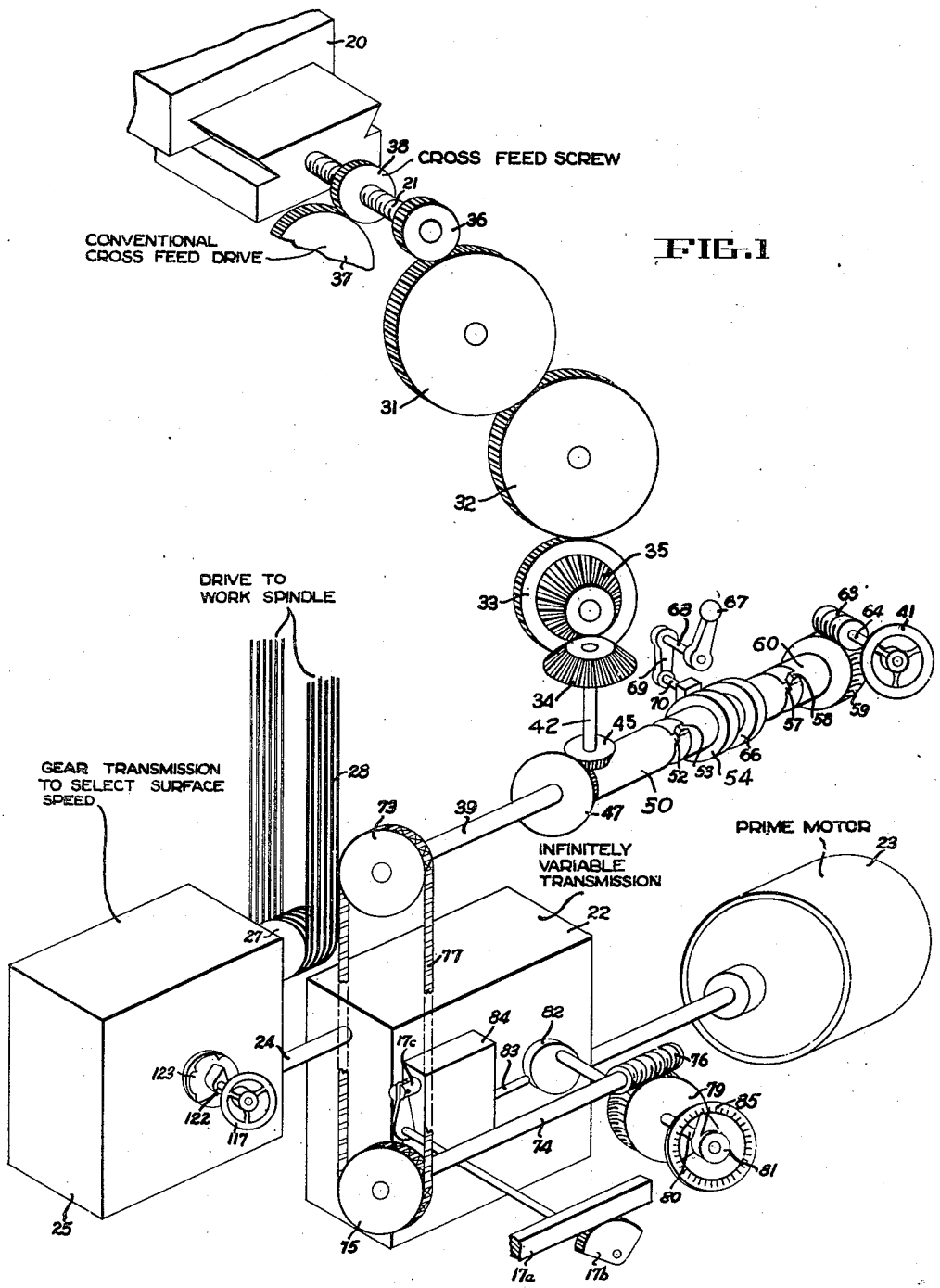
Figure 1 is a diagrammatic perspective view of the mechanism for performing the function of this invention.
Figure 2:
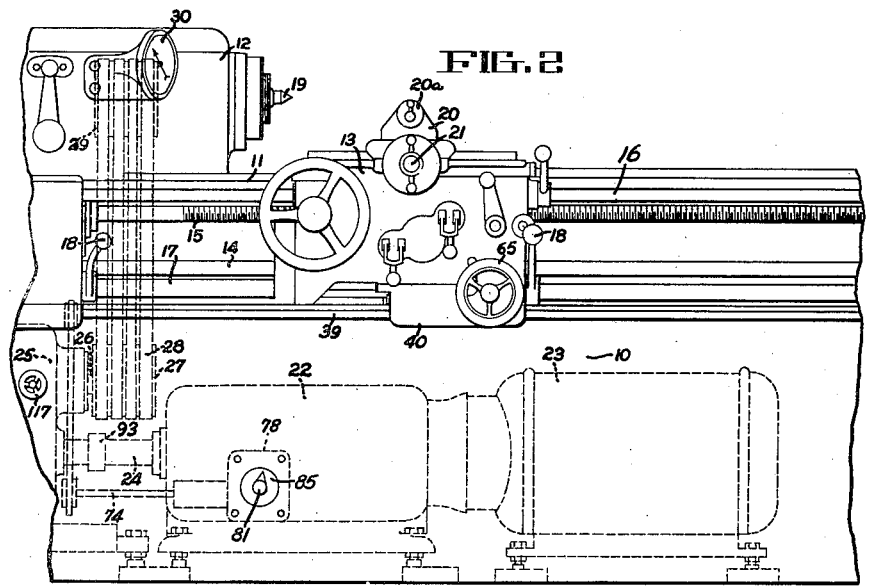
Figure 2 is a partial front view of a lathe to which the mechanism of this invention has been applied.

The apparatus of this invention has been applied to use upon a lathe which consists of a base 10, upon which conventional ways 11 are suitably supported. A head stock 12 is carried upon one end of the frame or base 10 while a conventional tail stock (not shown) is carried upon the opposite end of the ways 11.

A conventional carriage having an apron 13 is mounted upon the ways 11 and is longitudinally slidable thereupon in conventional manner. A feed rod 14 and a lead screw 15 extend longitudinally along the lathe and are associated with the apron 13 in conventional manner to perform the usual functions of longitudinally moving the carriage along the ways and of feeding the same for various screw-turning operations. A lead screw reverse rod 16 is associated with the apron 13 and extends into the head stock 12 for controlling operation of the lead screw 15. A start, stop reverse rod 17 is also associated with the apron 13 and is provided with operating levers 18 for actuating the rod 17. The start, stop reverse rod 17 extends into the gear housing associated with the head stock 12 and operates suitable mechanism therein for controlling the functions of the lathe carriage.

A cross slide 20 is mounted upon the carriage associated with the apron 13 in conventional manner and is adapted to move a cutting tool to and fro with respect the axis of rotation of the lathe spindle 19. The cross slide 20 is actuated by means of the cross feed screw 21 suitably associated therewith and driven in conventional manner from the feed rod 14.

The mechanisms previously mentioned are all conventional apparatus normally associated with a lathe or turning machine the various functions of which are well understood by those versed in the art.

To drive the lathe spindle 19 a variable speed transmission 22 is mounted within the base 10. An electric motor 23 is connected with the input shaft of the variable speed transmission 22 and is adapted to be started and stopped by means of the usual push-button control (not shown) for actuating the motor, which motor will operate continuously as long as the lathe or turning machine is being used. The output shaft 24 of the variable speed transmission 22 enters a change-speed mechanism 25 for driving the same, which mechanism will be hereinafter described. The output shaft 26 of the change-speed mechanism 25 is provided with a set of pulleys 27 which have belts 28 associated therewith. The belts 28 are in driving engagement with a set of pulleys 29 mounted upon the spindle 19 within the head stock 12.

The mechanism just described provides an apparatus for driving the spindle 19 through a variable speed drive mechanism from a constant speed motor. Such variable speed drive mechanisms, for driving the spindle of a lathe, are well known in the art and the association thereof with the spindle is conventional with the exception of the introduction of the change-speed mechanism 25, the function of which will be hereinafter more specifically described.

The variable speed mechanism 22 is of any conventional type which is capable of having the output shaft thereof varied over a rather wide range in an infinite number of speeds, and is preferably of the stepless variety in order to produce a substantially continuous variation in the speed of the spindle 19 in order to produce any speed of rotation desired at the spindle 19. Such infinitely variable speed transmissions are well known in the art and the specific structure thereof forms no part of this invention. Such transmissions can be either of the mechanical, hydraulic or electrical type, each of which is well known and each of which is capable of being varied throughout an infinite number of speeds.

When using a variable speed transmission for controlling the speed of operation of the spindle of a lathe it is conventional to provide a control mechanism which can be manually set to alter the mechanical arrangements of the variable speed drive to the extent of producing the proper output speed which in turn will produce the proper spindle speed. Such manual control mechanisms are well known, but a specific control mechanism will be hereinafter described for varying the speed setting of the variable speed drive.

Since the variable speed drives associated with turning machines have an infinite number of speeds at which they can be set, it is desirable to provide a device which will indicate spindle speeds directly. For this purpose a tachometer 30 is provided with a suitable driving connection with the spindle 19 and will indicate directly the speed thereof.

When using apparatus thus far disclosed the speed of the spindle of the lathe is predetermined according to the manual setting of the variable speed drive, and this setting is retained for all the turning operations required upon a given work piece unless a manual change is made upon the control mechanism of the variable speed drive. It is to be understood of course that when a variable speed drive is used as the driving means for the spindle of a lathe that the range of operation of the variable speed drive is such as will include the maximum as well as the minimum speeds desired to be obtained by the spindle. In other words, the range of the variable speed drive is continuous from maximum to minimum spindle speeds.

When working various metals with various present-day tools the selection of a spindle speed is insufficient for proper working of all metals. Even though the spindle speed selected may be proper for a given diameter of the work being turned, yet when the cutting tool is moved toward or away from the axis of rotation of the work the surface cutting speed will increase or decrease from that speed which had been pre-selected. In view of the precision now required when working various materials, it is essential that the surface cutting speed shall remain constant regardless of whether the cutting tool is longitudinally traversing the work or is transversely traversing the work.

A mechanism is thus provided for establishing constant surface cutting speeds between a work piece and a tool for maintaining the cutting speed pre-selected, regardless of the diameter at which the working tool is positioned with respect the axis of rotation of the work piece. The mechanism is associated with the cross feed screw and the cross slide of the lathe and is adapted to be driven thereby in a manner that the mechanism will alter the speed setting of the variable speed transmission to increase or decrease the output speed thereof when the cross slide moves inwardly or outwardly respectively from the axis of rotation of the work piece.

The mechanism in this invention for accomplishing this function consists of a gear train consisting of spur gears 31, 32 and 33 which drivingly interconnect the cross feed screw 21 of the cross slide 20 with a bevel gear 34. The gear 33 is a compound gear and has the bevel gear 35 associated therewith for engaging the bevel gear 34. The cross feed screw 21 is provided with a pinion 36 which is in engagement with the spur gear 31 for transmitting rotation of the cross feed screw 21 to the gear train 31, 32 and 33. The cross feed screw 21 is driven in conventional manner by a spur gear 37 in driving association with the pinion 38 mounted upon the cross feed screw 21. The spur gear 37 is in driving association with the feed rod 14 in the conventional manner, which is well understood by those versed in the art.

The control mechanism for the variable speed transmission 22 consists of a control rod 39 which extends longitudinally along the bed 10 of the lathe and extends through a housing 40 secured to the apron 13. The housing encloses the clutch mechanism for associating the control rod 39 with the gear train from the cross feed screw or with a manually operated mechanism controlled by the hand wheel 41. The control rod 39 extends along the full length of the bed 10 of the lathe whereby the lathe carriage and apron 13 can slide longitudinally along the lathe and the operating mechanism in the carriage will retain proper driving engagement with the control rod 39.

The operating mechanism for the control rod 39 consists of a power driven mechanism comprising the bevel gear 34 which is secured upon one end of a shaft 42 journaled in a bearing 43 secured to the bottom wall of the apron 13 by means of the bolts 44. The shaft 42 has a bevel gear 45 secured on the opposite end thereof from the bevel gear 34, which gear 45 is pinned to the shaft 42 by means of the pin 46. The bevel gear 45 is in meshing relationship with a bevel gear 47 journaled in the wall 48 of the housing 40. The housing 40 is suitably secured to the bottom wall of the apron 13 by means of the bolts 49. A sleeve 50 is journaled within the shank of the bevel gear 47 and extends forward of the face of the bevel gear 47. This sleeve 50 is secured to the bevel gear 47 by means of the key 51 so that the sleeve 50 and the gear 47 rotate as a unit. The forward end of the sleeve 50 is provided with clutch teeth 52 which are adapted to engage the clutch teeth 53 of a clutch spool 54.

The clutch spool 54 is keyed to the control rod 39 by means of a protruding key member 55 which is adapted to slide in the key way 56 provided in the control rod 39. The clutch spool 54 thus rotates the control rod 39 when the clutch teeth 53 thereof are in engagement with the clutch teeth 52, which in turn are driven by the bevel gears 47 and 45 and the gear train 31, 32 and 33 from the cross feed screw 21.

The end of the clutch spool 54 opposite from the end having the clutch teeth 53 is provided with clutch teeth 57 which are adapted to engage clutch teeth 58 provided on the end of a worm wheel 59. The shank 60 of the worm wheel 59 is journaled in a bearing 61 secured within the wall 62 of the housing 40. The worm wheel 59 is engaged by a worm 63 carried upon a shaft 64 which extends transversely of the axis of rotation of the worm wheel 59. A hand wheel 41 is secured to the shaft 64 for rotating the same and for rotating the worm wheel 59 and thereby rod 39 when the clutch teeth 57 and 58 are in engagement, whereby the control rod 39 can be manually operated under certain conditions.

The clutch spool 54 is provided with an annular groove 66. A shifting lever 67 is secured to one end of a shaft 68 extending transversely of the axis of rotation of the clutch spool 54. The opposite end of the shaft 68 is provided with a lever arm 69 which carries a pin 70. The pin 70 engages the annular slot 66 in the spool 54 for shifting the same axially along the control rod 39 for engagement and disengagement of the clutches provided at opposite ends of the spool 54.

A plurality of circumferential grooves 71 are provided around the clutch spool 54 and are adapted to be engaged by a detent plunger 72 for retaining the clutch spool 54 in any one of three positions.

The mechanism just described constitutes a feed-back from cross-feed screw 21 to variable speed transmission 22 and provides means for rotating the control rod 39 concomitantly with rotation of the cross feed screw 21 when the clutch teeth 52 and 53 are in engagement whereby the control rod 39 can operate a control mechanism associated with the variable speed transmission for increasing or decreasing the output speed thereof in response to the transverse movement of the tool-holder on the cross slide 20

The mechanism also provides a means for manually rotating the control rod 39 by the hand wheel 41 when the clutch teeth 57 and 58 are in engagement to operate the control mechanism of the variable speed transmission to pre-set the same at a predetermined output speed. It is thus seen that the means for power driving the control mechanism of the variable speed transmission, and the manual means for pre-setting the same, constitute a common operating mechanism.

The operating mechanism for varying the output speed of the variable speed transmission 22 is capable of considerable modification and is somewhat determined by the type of variable speed transmission used in transmitting the power from the driving motor 23 to the spindle 19. In the mechanism shown in this invention the mechanism for varying the speed of the output shaft 24 of the variable speed transmission 22 consists of a sprocket wheel 73 secured to the control rod 39. This sprocket wheel is properly carried within a gear housing adjacent the head stock 12 of the lathe, as indicated in Figure 1. A longitudinally extending shaft 74 is carried by a housing 78 mounted upon the case of the variable speed transmission 22 and has a sprocket wheel 75 secured on one end thereof and a worm 76 secured on the opposite end. A sprocket chain 77 extends between the sprocket wheels 73 and 75 for transmitting the rotary motion of the control rod 39 to the shaft 74. A worm wheel 79 is bearinged in the housing 78 and is in engagement with the worm 76. A shaft 80 carries the worm wheel 79 within the housing 78, the shaft 80 being provided with a pointer 81 on one end thereof and a cam 82 on the opposite end thereof. The cam 82 engages a reciprocating plunger 83 which extends from a control device 84 secured to the housing 78 of the variable speed transmission. The control device 84 is not specifically shown since such a control device depends upon the specific mechanical construction of the variable speed transmission. Such control device is therefore capable of considerable modification and is arranged to vary the mechanical mechanism of the variable speed transmission in order to regulate the speed of the output shaft 24 with respect the speed of the driving motor 23. Such control mechanisms are well known and are associated with all of well known types of variable speed transmissions and is therefore not specifically described. Rotation of the cam 82 causes the plunger 83 to move in a corresponding direction and thus actuate the control device 84 to thereby alter the physical arrangement of the variable speed transmission and change the speed ratio between the input and output shafts. The start, stop reverse rod 17 also actuates the control device 84 through the rack 17a and gear segment 17b which in turn actuates the control shaft 17c. The interconnection of the start, stop reverse rod 17 with the control device 84 is a conventional interconnection well known by those versed in the art.

The shape of the cam 82 determines the rate at which the speed of the output shaft 24 of the variable speed transmission will be increased as the cross feed screw 21 moves the toolholder 20a toward the axis of rotation of the spindle 19. The surface of this cam is shaped to actuate the control device 84 in a manner such that the output shaft 24 of the variable speed transmission 22 increases in speed in an increasing ratio as the toolholder 20a approaches the axis of rotation of the spindle 19. It can readily be seen that such a pre-generated cam face is required if the variable speed transmission is to vary the speed of rotation of the spindle at any predetermined rate. Such a predetermined rate of increase of speed of the spindle is required if the surface cutting speed upon a work piece is to be maintained constant as the cutting tool advances toward or away from the axis of rotation of the work piece.

The mechanism just previously described provides an apparatus for increasing the speed of the spindle 19 at an increasing rate as the work tool advances toward the center of rotation of the work piece whereby the surface cutting speed remains constant regardless of the diameter being turned.

Figure 3:
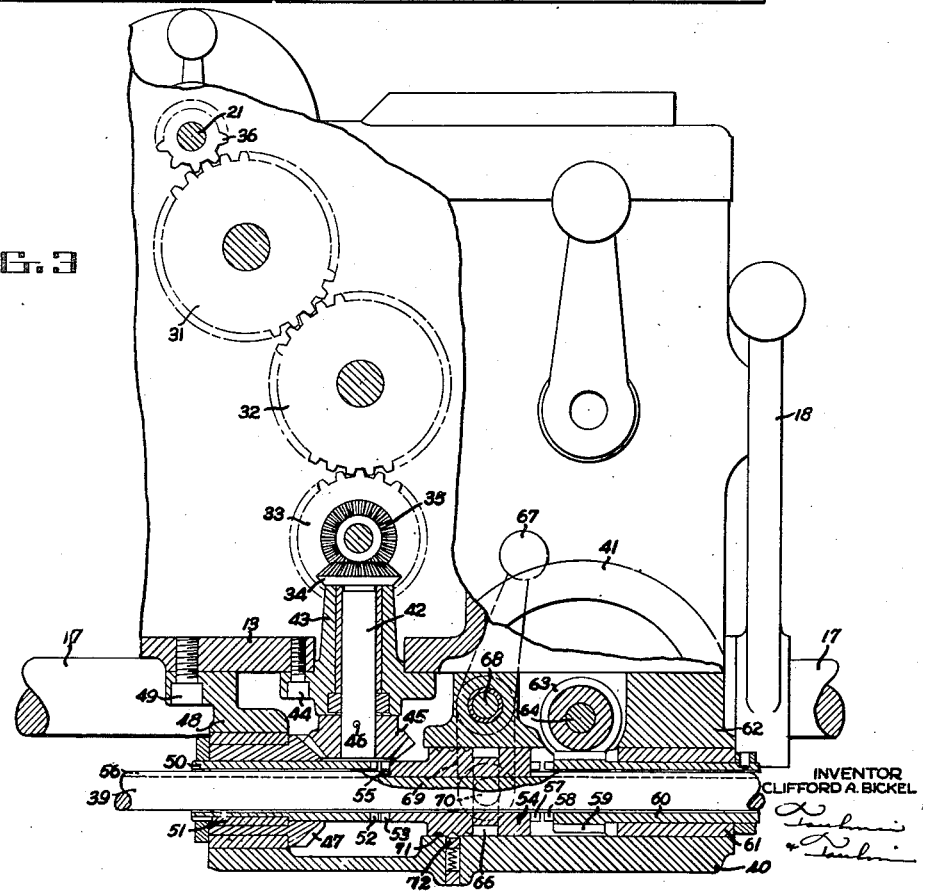
Figure 3 is a cross-sectional view of a portion of the apron of the lathe showing the mechanism for transmitting the motion of the cross feed screw to the constant surface cutting speed control rod.

The operation of the device described is as follows. A work piece is suitably positioned between the spindle 19 and the tail stock of the lathe. The clutch lever 67 is then shifted to the left (see Figure 3) whereby the clutch teeth 57 and 58 are engaged so that operation of the worm 63 will rotate the clutch spool 54 through the worm wheel 59 and the clutch teeth 57 and 58. The hand wheel 41 is then rotated to rotate the shaft 64 and thus rotate the control rod 39. Rotation of the control rod 39 is transmitted through the sprocket wheels 73 and 75 to the worm and worm wheel 76 and 79, thus rotating the cam 82. It is of course understood that the electric motor 23 has been previously started and that the lathe is in operation, the spindle 19 being driven through the variable speed transmission 22 and the change-speed mechanism 25, to be hereinafter described. For the purposes of the driving connection at this time the change speed transmission 25 can be considered as merely a direct drive from the output shaft 24 of the variable speed transmission to the output shaft 26 of the change speed transmission.

Rotation of the cam 82 actuates the plunger 83 of the variable speed transmission control device 84 whereby the speed of rotation of the output shaft 24 is varied, and thereby the speed of rotation of the spindle 19, and is indicated by the tachometer 30.

The lathe can now be used in the ordinary manner for turning articles with a constant spindle speed, which speed has been predetermined by varying the setting of the infinitely variable transmission 22 through means of the cam 82 and the control actuating mechanism 84.

In order to produce constant surface cutting speed for transverse cuts when made separately or in combination with longitudinal cuts, it is necessary that the cam 82 be rotated in response to the transverse motion of the cross slide 20, which motion is caused by the cross feed screw 21. As previously mentioned, the cam 82 has a predetermined contour for increasing the output speed of the variable speed transmission shaft 24 at a predetermined increasing rate when the cross slide advances toward the center of rotation of the spindle 19. The result of the increasing speed of rotation of the spindle 19 is indicated in the charts of Figures 7 and 8. As an example, if a 9 inch diameter work piece is to be turned and a surface cutting speed of 100 feet per minute is desirable the spindle speed will be 42 R. P. M., as indicated by the charts in Figures 7 and 8. As the cutting tool advances toward the center of the work piece until it reaches a 6 inch diameter, the working tool has moved through a distance of 1½ inches while the speed of rotation of the spindle is required to be increased to 64 R. P. M. in order to maintain the same surface cutting speed of 100 R. P. M. This has necessitated an increase of 16 R. P. M. However, as the cutting tool advances from a 6 inch diameter to a 3 inch diameter, which is again a 3 inch reduction in the diameter, it will be noted that the R. P. M. of the spindle must be increased from 64 R. P. M. to 127 R. P. M. which is an increase of 63 R. P. M. It will thus be seen that for like increments of movement of the cross slide toward the center of rotation of the work piece that the speed of rotation must be increased at an increasing rate to hold the surface cutting speed constant. The shape of the cam 82 has been developed to provide an infinite variable increase of speed of the spindle 19 which will follow the curve indicated in Figure 8. The curve of speed increase indicated in the chart of Figure 8 represents the complete range of operation of the infinitely variable variable speed transmission for cutting the minimum and maximum diameter work pieces which can be swung by the lathe, and through which range the constant surface speed control apparatus will function. It is to be understood that while the constant surface speed control mechanism has been herein indicated as functioning from the work diameters of 2 to 14 inches that the invention is not so limited to such diameters, but that the apparatus is capable of design to produce any unlimited range of operation, and is only limited by the range of operation of the infinitely variable variable speed drive.

To obtain such constant surface cutting as just previously mentioned, it is necessary that the relation of the cam 82 and the control actuating plunger 83 be pre-established as determined by the diameter of the work piece to be turned. It can readily be appreciated that the position of the face of the cam 82 with respect the control actuating plunger 83 cannot be indiscriminately selected since the variable speed transmission must be controlled to vary the speed of the output shaft 24 at an increasing rate, and that the increasing rate of speed of the shaft 24 has a definite relation with respect the diameter of the work piece being turned. A work piece diameter dial 85, shown in Figure 6, is rigidly secured adjacent the pointer 81 so that the pointer 81 can rotate with respect the work diameter dial 85 when the worm wheel 79 is rotated by the control rod 39. The work diameter dial 85 is marked off with indicia 86, Fig. 6, with which the pointer 81 can associate for indicating the position of the cam 82. When the pointer 81 is adjacent one of the indices of the work diameter dial 85 the cam 82 will be positioned in a position with respect the actuating plunger 83 of the variable speed transmission control device 84 so that the variable speed transmission 22 is set in a position to produce a rotation of the lathe spindle 19 which will give a surface cutting speed of 100 feet per minute, using the example previously described. That is, as the pointer 81 is adjacent indicia number 9 on the work diameter dial the cam 82 will be positioned so that the R. P. M. of the spindle will be 42, which speed will be at the point A indicated on the chart of Figure 8. This pre-setting of the cam 82 positions the same in the proper relation with respect the plunger 83 so that continued rotation of the cam 82 will cause the variable speed transmission to follow the upper portion of the curve indicated in Figure 8.

When it is desired to provide constant surface cutting speed, the control lever 67 is shifted to the right whereby the clutch teeth 52 and 53 are engaged to establish driving connection between the control rod 39 and the cross feed screw 21 through the gear train 31, 32, 33, 34, 46 and 47. As previously noted, the pointer 81 is pre-positioned adjacent one of the indicia on the work diameter dial 85, which indicia is selected to agree with the largest diameter which will be turned on the work piece. The diameters which are smaller than the pre-selected largest diameter will be automatically turned at the predetermined constant surface cutting speed in accordance with the actuation of the cam 82 since the cam 82 will be concomitantly driven with rotation of the cross feed screw 21 to thereby increase or decrease the speed of operation of the variable speed transmission in accordance with the transverse movement of the cross slide 20, which movement is interpreted by the cam 82. While the constant surface speed control mechanism herein described is a preferred form, yet there are many modifications for accomplishing this purpose of the invention, namely that of varying an infinitely variable variable speed transmission in accordance with the position of the cutting tool with respect the axis of rotation of the work piece.

The foregoing description has disclosed the manner whereby a constant surface cutting speed can be obtained. Any mechanism which is adjusted to produce a given constant surface cutting speed cannot produce any other constant surface cutting speed merely by regulating the output shaft of the variable speed transmission since, as heretofore discussed, the control mechanism for the variable speed transmission must be pre-positioned in order to establish a definite relation between the variable speed control mechanism and the position of the cross slide with respect the axis of rotation of the work piece.

To obtain a plurality of individual and different surface cutting speeds which will remain constant throughout the entire range of operation of the variable speed transmission, this invention provides a change-speed transmission which is interposed between the variable speed transmission 22 and the spindle of the lathe. The change-speed mechanism consists of a housing 87. An input shaft 88 is bearinged in the wall 89 of the housing 87 and in a protruding portion by means of the ball bearing 91. The input shaft 88 is connected to the output shaft 24 of the variable speed transmission 22 by means of a suitable coupling 93.

A pinion 92 is keyed upon the shaft 88 and is in mesh with a spur gear 94 which is keyed upon a shaft 95 extending parallel with the shaft 88. The shaft 95 is bearinged in opposite walls of the housing 87 by means of the ball bearings 96. The shaft 95 carries three other spur gears, 97, 98 and 99, which are suitably keyed to the shaft 95 and rotate therewith.

The output shaft 26 is bearinged in opposite walls of the housing 87 by means of ball bearings 101 and is arranged parallel with respect the shaft 95. A cluster of gears 102, 103, 104 and the pinion 105 are secured to the sleeve 106 which is journaled upon the shaft 26. The gears 102, 103 and 104 are suitably keyed to the sleeve 106 while the pinion is formed as an integral part thereof. The sleeve 106 is provided with a keyway 107 which is arranged to slide over a key 108 positioned in the shaft 26.

The gear 104 is provided with a shank 109 which has an annular groove 110 therein. A fork 111, secured to a rack 112 is arranged within the annular groove 110 and is provided for moving the cluster of gears axially along the shaft 26 when the rack 112 is reciprocated.

The rack 112 is carried within the slots 113 provided in the housing 87 and is arranged to reciprocate within the housing in a parallel relation with respect to the shaft 26. The rack 112 thus carries the fork 111 in a manner to axially move the cluster of gears so that the gears may be brought into proper meshing relation with the gears 97, 98, 99 and 94 arranged on the shaft 95.

A spur gear 114 is fixed upon a sleeve 115 which in turn is splined to the shaft 116 which extends outwardly beyond the housing 87 and is provided with a hand wheel 117 secured to the end thereof.

An indexing ring 118 is secured to the wall of the housing 87 and surrounds the shaft 116. An index dog 119, which has a tooth 120, is arranged to engage recesses 121 in the index ring 118. The recesses 121 in the index ring are positioned about the circumference thereof in a manner that when the tooth 120 of the index dog 119 is in engagement with one of the recesses 121, one of the cluster of gears is in engagement with the cooperating adjacent gear on shaft 95 to thereby establish driving relation between the input shaft 88 and the output shaft 26. As indicated on Figure 4, the gear 94 on the shaft 95 is in meshing relationship with the pinion 105 on the output shaft 26.

The ratio of cooperating adjacent gears in the change-speed mechanism 25 is such as to establish a gear ratio between the output shaft 24 of the variable speed transmission and the spindle 19 of the lathe whereby the spindle 19 can be driven at a predetermined constant surface cutting speed in accordance with the control mechanism heretofore described when the change-speed transmission is set to a pre-selected position. As indicated in Figure 4, the change gear transmission is now adjusted to operate the output shaft 26 at the highest speed with respect the input shaft 88, the gears 97, 98 and 99 providing intermediate speed ratios between the input and output shafts when they are brought into proper meshing relationship with the gears 102, 103 and 104.

In order to indicate the position of the gears within the change-speed mechanism 25 an indexing pointer is secured to the shaft 116 and is arranged to traverse the face of a gear ratio dial 123 (Figs. 4 and 5) which is rigidly secured adjacent thereto and is mounted upon a suitable portion of the machine frame. The index dog 119 provides a suitable clutch mechanism to permit the spur gear 114 to rotate and thus reciprocate the rack 112 to thereby shift the cluster of gears with respect the gears positioned on the shaft 95. A spring 124 surrounds the shaft 116 and has one end thereof bearinged against the machine frame 10 while the opposite end bears against a collar 125 secured to the shaft 116, whereby the dog 119 is urged into engagement with the index ring 118 when the hand wheel 117 is released.

As heretofore described the control mechanism for the variable speed transmission establishes a predetermined rate of increase of spindle speed when the cross slide is moved toward the axis of rotation of the work piece. The control mechanism is capable of performing only a single constant surface cutting speed. It is the purpose of the change-speed transmission 25 to effect a gear ratio change between the infinitely variable speed transmission 22 and the spindle 19 of the lathe whereby the entire range of constant surface cutting speed can be increased or decreased. As heretofore mentioned, the variable speed transmission for obtaining the constant surface cutting speed is capable of operating throughout the entire range of operation of which the turning machine is capable. The change-speed transmission thus becomes a mechanism for altering completely the range of operation of the turning machine for regulating or changing the surface cutting speed throughout the entire range of constant operation. It is to be understood that while the change-speed mechanism herein disclosed effects four different surface speeds, that other speeds can be selected according to the gear ratios built into the change-speed mechanism and also that the number of speed changes can be increased merely by adding to the number of gear ratios available within the change-speed mechanism.

Figure 4:
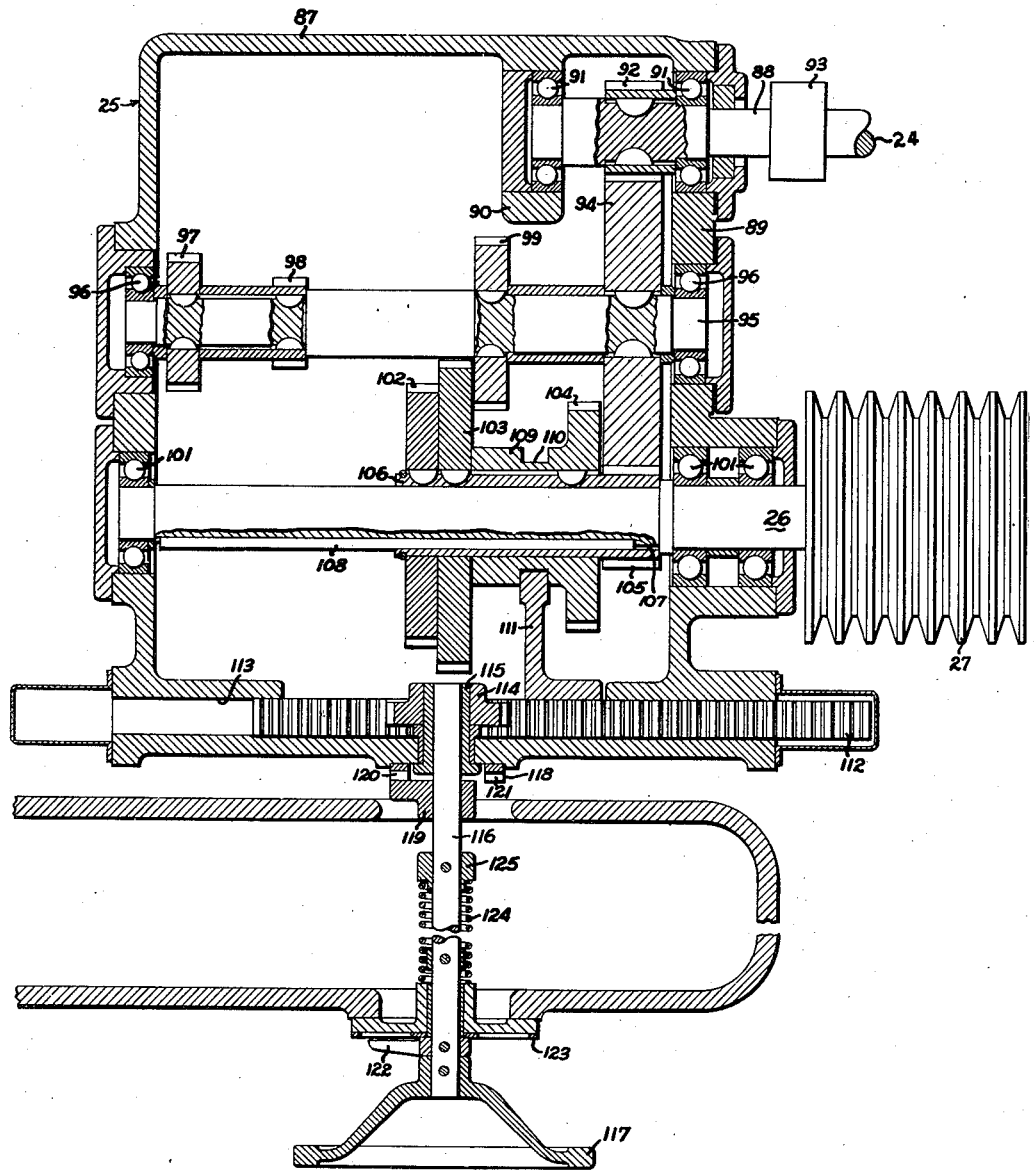
Figure 4 is a horizontal cross-sectional view of a speed-change mechanism interposed between the variable speed transmission and the spindle of the mechanism of this invention.

As indicated on the chart in Figure 7, which chart corresponds to the operation of the change speed mechanism of Figure 4, the change-speed mechanism is capable of operating at four different surface speeds. The surface speeds indicated are retained constant through out the entire work range of the variable speed transmission, that is, from work diameters of 2 to 14 inches, as indicated on the chart.

When setting the lathe or turning machine for constant surface cutting speed operation, the variable speed transmission control mechanism is set as previously described. The change-speed transmission is then adjusted to indicate the surface speed at which the mechanism will operate, the pointer 122 being positioned adjacent one of the indicia on the gear ratio dial 123, which indicia indicates the feet per minute which will be turned when the pointer is set adjacent thereto, the cluster of gears being positioned accordingly with respect the gears on the shaft 95 within the change-speed mechanism.

It is thus seen that I have provided a simplified mechanism for accomplishing constant surface cutting speed upon a work piece in response to the movement of the cross slide of a lathe, and have also provided mechanism for altering the complete range of operation over which the constant surface cutting speeds are obtainable. While the apparatus herein disclosed for changing the range of operation of the constant surface cutting speed has been described and disclosed as a separate gear change mechanism interposed between the variable speed transmission and the spindle of the lathe, it is to be understood that the gear change or change-speed mechanism need not be a completely independent apparatus but could be directly associated with the spindle of the lathe.

While the mechanism herein described discloses a preferred form of the apparatus it is to be understood that the apparatus is capable of considerable mechanical modification, all of which is intended to be included within the scope of the invention.

Having thus fully described my invention, what I claim as new and desire to secure by Letters Patent is:

1. In a lathe the combination of a rotatable work carrying spindle, a transversely movable toolholder, manual means for moving said toolholder, an infinitely variable speed transmission for driving said spindle, control means for regulating the speed of said transmission, means interconnecting said toolholder with said transmission control means for automatically varying the speed thereof with respect the relative positioning of said toolholder to the axis of rotation of said spindle for regulating the speed of said spindle to maintain the surface speed of the work carried constant with respect the work tool carried by the toolholder, manual setting means for setting said control means for said variable speed transmission to obtain a determined speed output therefrom as determined by the initial diameter of the work to be turned, clutch means for selectively selecting between manual or automatic operation of said control means and for disconnecting said control means for said toolholder, and a selective gear transmission drivingly interconnecting said variable speed transmission with said spindle to provide manual selection of the surface speed of the speed of rotation of said spindle and thus determine the surface speed of the work carried thereby.

2. In a lathe, the combination of, a spindle for receiving and rotating a work piece, a cross slide, means including a power driven feed rod and manually operable means for moving said cross slide to and from the axis of rotation of said spindle for normal and conventional operation of said cross slide, a variable speed transmission, means drivingly connecting said transmission to said spindle, control means for regulating the output speed of said transmission and thus the speed of said spindle, means drivingly connecting said cross slide to said control means for automatically regulating the operation of said transmission in response to movement of said cross slide, clutch means in said last mentioned driving connection for disengaging the same whereby said cross slide can operate without changing the operation of said transmission, and manual means for actuating said control means to set the output speed of said transmission to drive said spindle at a predetermined constant speed.

3. In a lathe, the combination of, a spindle for receiving and rotating a work piece, a cross slide, means including a power driven feed rod and manually operable means for moving said cross slide to and from the axis of rotation of said spindle for normal and conventional operation of said cross slide, a variable speed transmission, means drivingly connecting said transmission to said spindle, control means for regulating the output speed of said transmission and thus the speed of said spindle, means drivingly connecting said cross slide to said control means for automatically regulating the operation of said transmission in response to movement of said cross slide, and clutch means in said last mentioned driving connection having one position for disengaging the same whereby said cross slide can operate without changing the operation of said transmission and having another position for engaging manual means whereby said control means is actuated to set said transmission at a predetermined output speed.

4. In a lathe, the combination of, a spindle, a cross slide, means moving said cross slide toward and away from the axis of said spindle, means including a power driven feed rod and manually operable means for driving said last mentioned means to produce normal feeding operation of said cross slide, a variable speed transmission having control means for regulating the output speed thereof, means drivingly connecting said transmission to said spindle, means drivingly connecting said means for moving said cross slide to said control means for said transmission to actuate the same in response to movement of said cross slide to vary the spindle speed in accordance with the position of the cross slide relative to the axis of the spindle, clutch means interposed in said last mentioned driving connection, and manual means for actuating said control means to set the operating speed of said transmission, said clutch means having one position wherein said last mentioned driving connection is disengaged from said transmission control means to permit normal operation of said cross slide and another position for engaging said last mentioned driving connection with said transmission control means to regulate the operation of said transmission in accordance with the position of said cross slide relative to the axis of said spindle.

5. In a lathe, the combination of, a spindle, a cross slide, means moving said cross slide toward and away from the axis of said spindle, means including a power driven feed rod and manually operable means for driving said last mentioned means to produce normal feeding operation of said cross slide, a variable speed transmission having control means for regulating the output speed thereof, means drivingly connecting said transmission to said spindle, means drivingly connecting said means for moving said cross slide to said control means for said transmission to actuate the same in response to movement of said cross slide to vary the spindle speed in accordance with the position of the cross slide relative to the axis of the spindle, clutch means interposed in said last mentioned driving connection, and manual means for actuating said control means to set the operating speed of said transmission, said clutch means having one position wherein said last mentioned driving connection is disengaged from said transmission control means to permit normal operation of said cross slide and another position for engaging said last mentioned driving connection with said transmission control means to regulate the operation of said transmission in accordance with the position of said cross slide relative to the axis of said spindle, and a third position to disengage said last mentioned driving connection and engage said manual means to preset the operating speed of said transmission.

6. In a lathe, the combination of, a spindle, a cross slide having a cross feed screw for driving the same, means including a power driven feed rod and manually operable means for driving said cross feed screw to obtain normal cross feed operation of said cross slide, a variable speed transmission having control means for regulating the output speed thereof, a selective gear change mechanism driven by said transmission having means driving said spindle, means driven by said cross feed screw for actuating said control means to change the operation of said transmission and vary the speed of said spindle in accordance with movement of said cross slide as controlled by said cross feed screw, and clutch means co-operating with said last mentioned driven means for selecting between constant spindle speed operation with normal cross feed operation or variable speed spindle operation controlled automatically in response to the position of said cross slide relative to the axis of the spindle.

7. In a lathe, the combination of, a spindle, a cross slide having a cross feed screw for driving the same, means including a power driven feed rod and manually operable means for driving said cross feed screw to obtain normal cross feed operation of said cross slide, a variable speed transmission having control means for regulating the output speed thereof, a selective gear change mechanism driven by said transmission having means driving said spindle, means driven by said cross feed screw for actuating said control means to change the operation of said transmission and vary the speed of said spindle in accordance with movement of said cross slide as controlled by said cross feed screw, clutch means co-operating with said last mentioned driven means for selecting between constant spindle speed operation with normal cross feed operation or variable speed spindle operation controlled automatically in response to the position of said cross slide relative to the axis of the spindle, manual means for pre-setting the output speed of said transmission in accordance with the initial diameter to be turned upon a work piece carried by the spindle, and means for setting said gear change mechanism to select the speed range in which said spindle will be driven.

8. In a lathe, the combination of, a lathe bed, power means positioned within said lathe bed including a motor, a variable speed transmission and a gear change mechanism connected to be driven by said motor, a headstock mounted on said lathe bed having a spindle therein rotatable on a work axis, means drivingly connecting said spindle with said gear change mechanism, a lathe carriage having a cross slide thereon and an apron suspended therefrom, a power drive from said motor to said cross slide, control means for regulating the speed of operation of said transmission, and a feed-back for directly effecting actuation of said control means from said cross slide, including a control rod for actuating said control means and extending longitudinally along said lathe bed and through said apron, driving means on said apron interconnecting said cross slide and said control rod for driving the same upon actuation of said cross slide to change the speed setting of said transmission in response to the position of said cross slide relative to the axis of said spindle, manually operated means positioned upon said apron for actuating said rod to preset the output speed of said transmission in accordance with the radial position of said cross slide relative to the axis of said spindle, and manually operated means extending from said gear change mechanism for selecting the speed range of said transmission that is transmitted therethrough to said spindle.

9. In a lathe, the combination of, a lathe bed, a prime mover, a variable speed transmission and a gear change mechanism drivingly connected in series with said prime mover, a headstock mounted on said lathe bed having a spindle therein, means drivingly connecting said spindle with said gear change mechanism, a lathe carriage having a cross slide thereon and an apron suspended therefrom, a power drive from said prime mover to said cross slide, control means for regulating the speed of operation of said transmission, a control rod for actuating said control means extending longitudinally along said lathe bed adjacent said apron, driving means on said apron interconnecting said cross slide and said control rod for driving said rod upon actuation of said cross slide to change the speed setting of said transmission in response to the position of said cross slide transversely of the axis of said spindle, said last mentioned driving means including a gear train drivingly interconnecting said cross slide and said rod, and a clutch means in said gear train for selectively connecting and disconnecting the same to said rod whereby said control means for said transmission can be selectively connected or disconnected from driving co-operation with said cross slide.

10. In a lathe, the combination of, a lathe bed, power means positioned within said lathe bed including a prime mover, a variable speed transmission and a gear change mechanism drivingly connected, a headstock mounted on said lathe bed having a spindle therein, means drivingly connecting said spindle with said gear change mechanism, a lathe carriage having a cross slide thereon and an apron suspended therefrom, control means for regulating the speed of operation of said transmission, a control rod for actuating said control means extending longitudinally along said lathe bed and through said apron, a gear train drivingly interconnecting said cross slide and said rod for actuating said control means for said transmission to change the output speed thereof in accordance with the radial position of said cross slide relative to the output speed of said spindle, manually operated means carried upon said apron for actuating said rod to manually set the output speed of said transmission in accordance with the initial diameter to be turned upon a work piece carried upon said spindle, clutch means selectively engageable with said manually operated means and said gear train to permit said manually operated means to actuate said rod to initially set the output speed of said transmission and shiftable to interconnect said gear train and said rod for automatic control of said transmission by said cross slide, and manually operated means for shifting said gear change mechanism to select the operating range of said transmission that will be transmitted therethrough to said spindle.

11. In a lathe the combination of a spindle, a movable toolholder, change speed mechanism drivingly connected to said spindle, a variable speed transmission drivingly connected to said change speed mechanism for driving said spindle therethrough, speed control means for changing the output speed of said transmission, control means associated with said toolholder for automatically regulating said speed control means to change the output speed of said transmission in response to movement of said toolholder to maintain a constant surface cutting speed of the work relative to the tool irrespective of the diameter of the work, manually operated means for manually adjusting said speed control means to a preselected speed, and a manually operated clutch mechanism operably associated with said control means and said manual adjusting means for selectively operably connecting or disconnecting said speed control means to said toolholder control means or said manual adjusting means whereby to permit operation of said toolholder independently of said speed control means, and means for manually altering the speed ratio of the change speed mechanism, for selecting the desired rate of surface cutting speed.

CLIFFORD A. BICKEL.